United States Patent Office 3,339,988
Patented Sept. 5, 1967

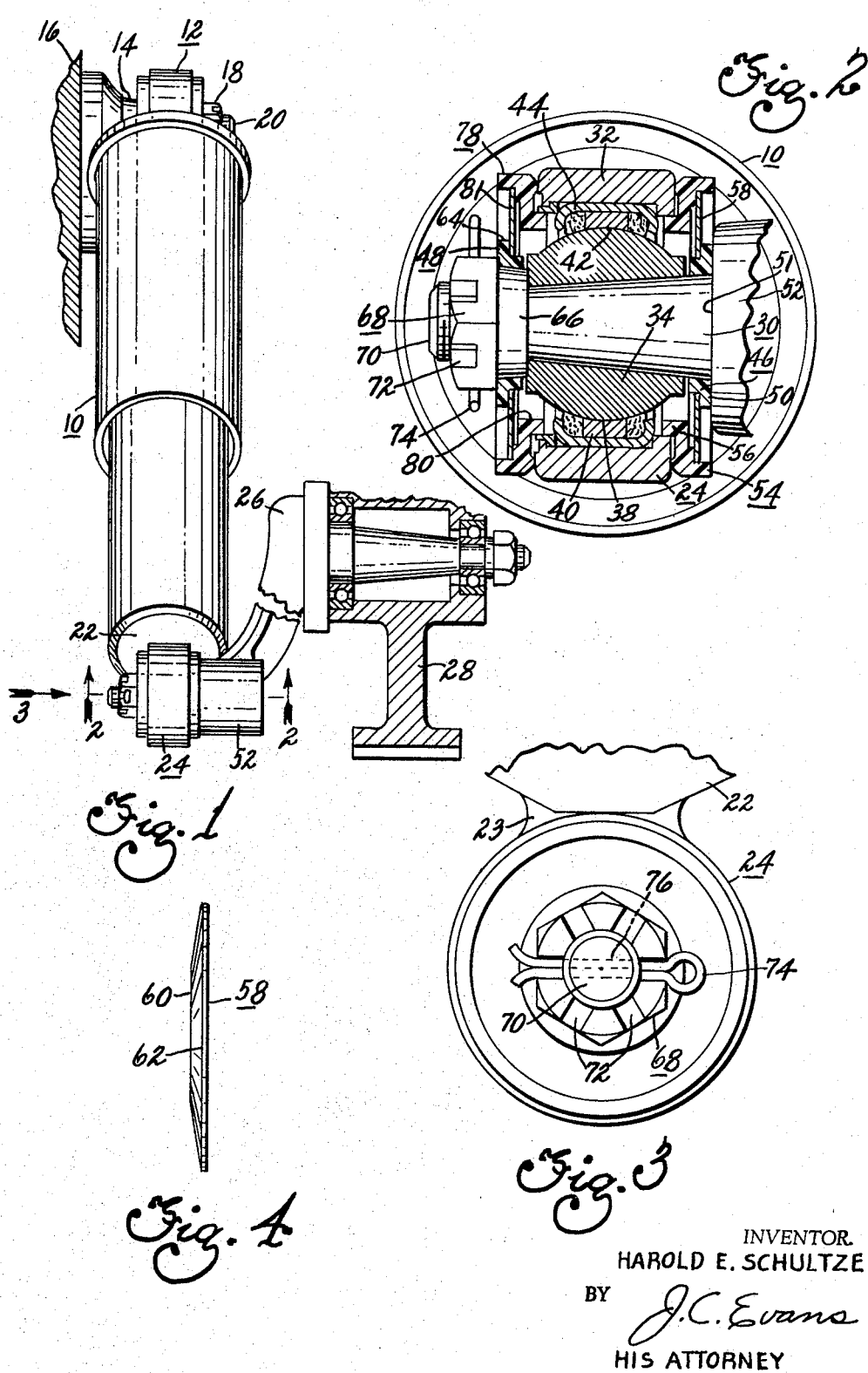

3,339,988
END MOUNTING ASSEMBLY FOR SHOCK ABSORBER
Harold E. Schultze, Dayton, Ohio, assignor to General Motors Corporation, Detroit, Mich., a corporation of Delaware
Filed Nov. 27, 1964, Ser. No. 414,377
1 Claim. (Cl. 308—36.2)

ABSTRACT OF THE DISCLOSURE

In preferred form a shock absorber mounting assembly including a tapered shaft carrying a spherical bearing supported for universal movement within a surrounding outer annular housing, the housing having open end faces sealed by a large diameter annular sealing member supported on the outer housing and a small diameter sealing member supported on the tapered shaft and located concentrically inside the large diameter sealing element and a Belleville spring located between the sealing elements to bias the sealing elements into sealing engagement with the housing and the shaft.

---

This invention relates to end mounting assemblies for shock absorbers and more particularly to an oscillatable end mounting support with seals.

One problem with many oscillatable end mounting assemblies for shock absorbers is that of how to adequately seal the bearing elements therein against dirt, moisture and the like in an economical manner.

An object of the present invention is to improve end mounting assemblies for shock absorbers of the type having relatively oscillatable bearing members with an open ended ring like outer housing by the provision of a seal unit at each side thereof including concentrically arranged inner and outer annular sealing members biased in opposite directions by an imperforate spring washer that forms part of the sealing surface.

A still further object of the present invention is the provision of an improved shock absorber end mounting assembly of the type having limited universal movement for assembling the shock absorber in limited spaces between support members on a sprung and an unsprung mass including a ring like outer housing having open ends each closed by an improved sealing unit including concentrically arranged inner and outer annular sealing members and an imperforate spring washer interposed therebetween biasing the annular sealing members in opposite directions into sealing relationship with the end mounting assembly and wherein the spring washer serves to prevent any undue oscillatory movement of said outer housing about the longitudinal axis of the shock absorber once the shock absorber has been connected between the sprung and unsprung masses.

Further objects and advantages of the present invention will be apparent from the following description, reference being had to the accompanying drawing wherein a preferred embodiment of the present invention is clearly shown.

In the drawing:

FIGURE 1 is a view in elevation of a shock absorber installation including the end mounting assembly of the present invention;

FIGURE 2 is an enlarged view in horizontal section taken along the line 2—2 of FIGURE 1;

FIGURE 3 is an enlarged view in vertical section taken along the line 3—3 of FIGURE 1; and FIGURE 4 is an elevational view of a washer element in the end mounting assembly.

Referring now to the drawing, in FIGURE 1 a shock absorber installation is illustrated including a heavy duty type double direct acting hydraulic shock absorber unit 10 having an upper end mounting assembly 12 connected on a suitable fixed support shaft 14 on a sprung mass 16 such as the body of a Caterpillar tractor or the like. The assembly 12 is fastened to the shaft 14 by suitable means such as a nut element 18 threadably received on a threaded outer end 20 of the shaft 14. A bottom enclosure member 22 of the shock absorber 10 is fixedly secured by suitable means such as welding at 23 to a lower end mounting assembly 24 constructed in accordance with certain principles of the present invention. A road arm 26 for supporting a wheel element 28 has a shaft 30 on one end thereof that supportingly receives the end mounting assembly 24 for interconnecting shock absorber 10 to arm 26 for oscillatable movement about the axis of shaft 30 which is substantially perpendicular to the longitudinal axis of the shock absorber.

The shock absorber 10 is merely representative of one suitable heavy duty shock absorber that is adaptable for association with the present invention and reference is hereby made to U.S. Patent 2,880,022, issued Mar. 31, 1959, to H. E. Schultze, for a more detailed explanation of this type of shock absorber.

The end mounting assembly 24 more particularly includes a mounting ring or open ended outer housing 32 surrounding an inner bearing element 34 that is slidably received upon the tapered outer surface of shaft 30. The inner bearing element 34 has a generally spherically shaped outer surface 38 in spaced relationship with the housing 32 for supportingly receiving an annular bearing packing member 40 having a concave inner surface 42 of a substantially spherical shape like that of surface 38. The bearing packing member 40 is held in an annular retainer 44 having a channel shaped section and having an outer surface fitted within the outer housing 32 as best illustrated in FIGURE 2. By virtue of the illustrated arrangement, the outer housing 32 has a limited universal movement relative to the inner bearing element 34 constituting both a limited oscillatory movement about the longitudinal axis of the shock absorber and a like limited oscillatory movement about the axis of the shaft 30. By virtue of this arrangement, during the assembly of shock absorber 10 in limited spaces as, for example, between the shaft 14 and shaft 30, the assembly 24 can be partially slipped onto the shaft 30 and the shock absorber 10 can be tilted because of the oscillatory movement set forth above sufficiently to allow the top mounting assembly 12 to be slipped over the upper support shaft 14 and secured thereto. Then the bottom mounting assembly 24 can be fastened to the shaft 30 to complete the assembly.

Once the shock absorber is in place it is desirable to limit its oscillatory movement about its own longitudinal axis to prevent excessive wear between the pumping cylinder and piston therein as is more particularly set forth in the above-mentioned Schultze patent. Seal units 46, 48 on either side of the housing 32 are arranged to prevent the entrance of moisture, dirt or the like interiorly of the assembly 24 and in accordance with certain of the principles of the present invention include means to limit oscillatory movement of housing 32 about the longitudinal axis of shock absorber 10.

In the illustrated body of the invention the inboard seal unit 46 includes an inner arcuate sealing member 50 slidably supportingly received on a large diameter inner end of the tapered shaft 30 where it sealingly engages against an end face 51 of a hub 52 on the road arm 26. Concentrically arranged around the inner seal member 50 is an annular radially outer seal member 54 supported on outer housing 32 by having a small diameter end 56 thereon directed into an open side of the housing 32 to be in spaced relationship with the inner seal member 50. Between the inner and outer inboard seal members 50, 54 is located a stressed, spring washer 58 of the Belleville spring type that has an unstressed configuration as illustrated in FIGURE 4 wherein an inner peripheral edge 60 thereof is spaced from the outer peripheral edge 62 thereof to form an imperforate conical annular shape of truncated form. By virtue of this configuration, when the unit is assembled the inner and outer peripheral edges 60, 62 are aligned to thereby cause the spring washer 58 to biasingly engage the inner and outer sealing members 50, 54 to cause them to be respectively held in sealing engagement with the face 51 of the hub 52 and the inboard side of the outer housing 32.

On the opposite side of the housing 32 the sealing unit 48 includes an inner annular sealing member 64 slidably supported on a shoulder or extension 66 of a nut 68 threaded on the end 70 of the tapered shaft 30 into engagement with the outboard end of the inner bearing element 34 for holding the assembly 24 together. The nut 68 has a plurality of indexing serrations 72 therein located circumferentially thereabout for receiving a pin 74 that is directed into an opening 76 in the shaft 70 for interlocking the nut thereto.

By virtue of the supporting shoulder 66 on the nut 68, the inner annular sealing element 64 of unit 48 may be identical to the counterpart sealing member on the opposite side of the assembly 24. Additionally, a radially outer annular sealing element 78 having a small diameter inner end 80 supported in the outer housing 32 on the outboard side thereof is arranged concentrically of and in surrounding spaced relationship with the inner member 64. The inner and outer sealing members 64, 78 are biased by an imperforate sealing member 81 like the spring washer 58 on the inboard side that serves to complete the sealing surface of unit 48 while biasingly directing the inner and outer seal mebers 64, 78 in opposite directions and into sealing engagement respectively with the nut 68 and outer housing 32.

By virtue of the present invention, a sealed oscillatable end mounting assembly is provided for connecting a heavy duty shock absorber 10 or the like to an unsprung mass such as a road arm 26. The seal units 46, 48 further include the feature of stressed spring washers that form part of the sealing units and also serve as means for resisting a tendency for the outer housing 32 of the shock absorber mounting assembly to oscillate about the longitudinal axis of the shock absorber to affect an undesirable relative wear between its piston and pumping cylinder.

Moreover, the unit includes a capability for a limited universal movement to aid in the assembly of the shock absorber in limited space environments and a mount assembling connection that enables the same sealing unit to be used on either end of such a structure.

While the embodiment of the present invention as herein disclosed constitutes a preferred form, it is to be understood that other forms might be adopted.

What is claimed is as follows:

An end mounting assembly for connecting a shock absorber to a suspension component comprising, a support shaft having opposite ends and an axis substantially perpendicular to that of the longitudinal axis of the shock absorber, an inner bearing member supported by the support shaft, an outer mounting ring forming a housing around a part of said inner bearing element in spaced relationship thereto, bearing means supported between said outer mounting ring and said inner bearing member for allowing a predetermined oscillatable movement therebetween, an inner annular shaped sealing element slidably supported on one end of said support shaft, a larger diameter sealing element supported by said outer mounting ring concentric with respect to said inner annular sealing element and in spaced surrounding relationship therewith, an imperforate spring washer having the form of an annulus with the inner periphery thereof engaging said inner annular sealing element and the outer periphery thereof engaging the outer sealing element, said spring washer being stressed to bias said inner and outer sealing elements in opposite directions into sealing engagement with said support shaft and said outer mounting ring respectively, a fastener on the opposite end of said shaft having an extension thereon, a second inner annular sealing element supported on the extension of the fastener, a second larger diameter sealing element supported by said outer mounting ring in spaced surrounding relationship with said second inner annular sealing element, a second imperforate spring washer having a form of an annulus with its inner peripheral edge in engagement with said second inner sealing member and its outer peripheral edge in engagement with said second larger diameter sealing element, said imperforate spring washer being stressed to bias said second inner and outer annular sealing elements in opposite directions to maintain them in sealing engagement with said fastener and said outer mounting ring respectively.

References Cited

UNITED STATES PATENTS

| 926,803 | 7/1909 | Braddock | 308—36.2 X |
|---|---|---|---|
| 2,251,020 | 7/1941 | Murphy | 308—36.2 X |
| 2,635,894 | 4/1953 | Jackman | 280—96.2 |
| 2,856,198 | 10/1958 | Muller | 280—96.2 |
| 2,978,264 | 4/1961 | Campbell | 308—36.2 |
| 3,073,617 | 1/1963 | Schultz | 280—96.2 |

FOREIGN PATENTS

| 962,397 | 12/1949 | France. |
|---|---|---|
| 727,135 | 3/1955 | Great Britain. |

MARTIN P. SCHWADRON, *Primary Examiner.*

R. F. HESS, *Assistant Examiner.*